Nov. 10, 1925.
E. A. HUFFMAN
1,560,819
SELF BINDER KNOTTER
Filed April 2, 1925
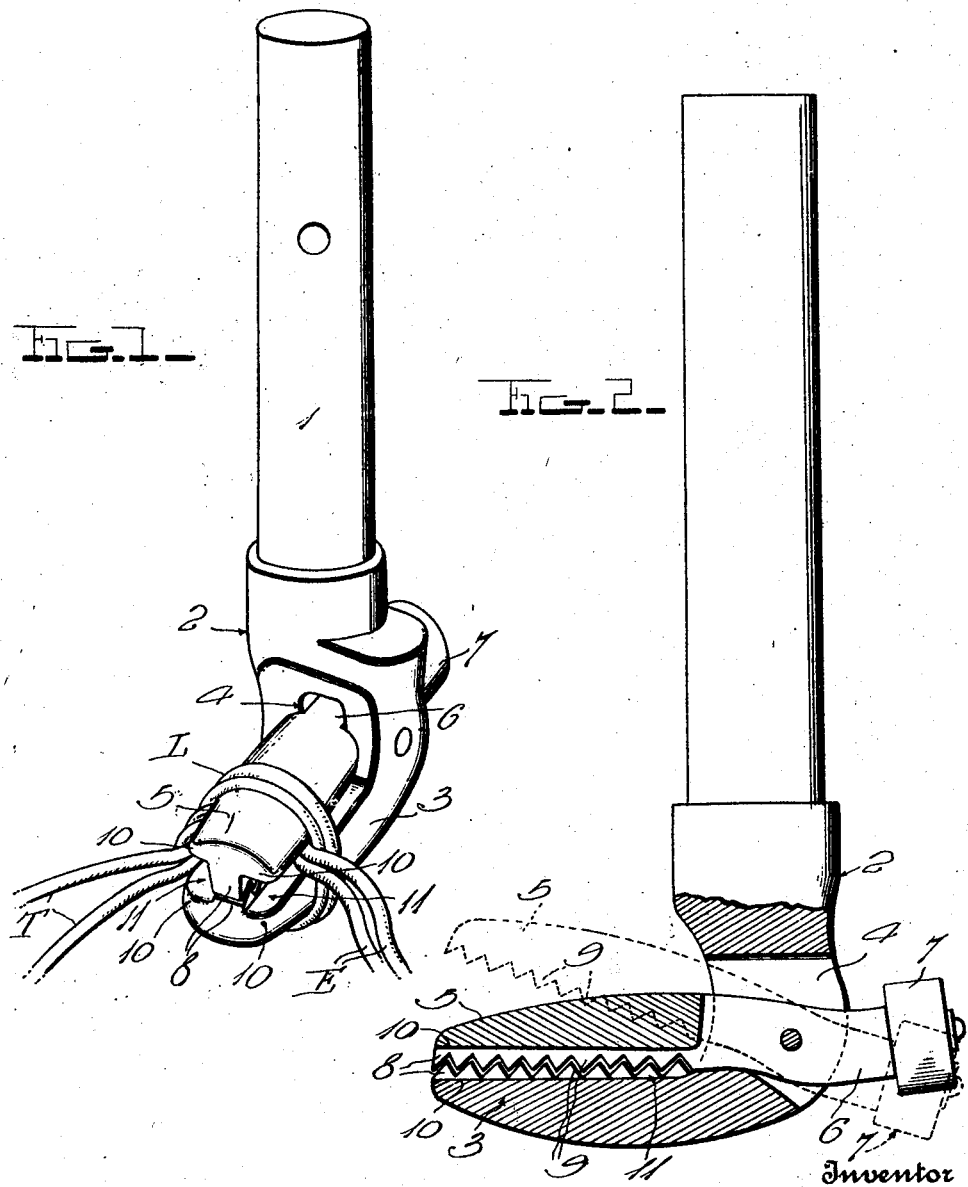
Witness
H. Woodard
Inventor
E. A. Huffman
By H. B. Willson & Co
Attorneys Patented Nov. 10, 1925.

1,560,819

UNITED STATES PATENT OFFICE.

ELBERT ANSON HUFFMAN, OF PONCHA SPRINGS, COLORADO, ASSIGNOR OF ONE-HALF TO HARRY J. BECK, OF SALIDA, COLORADO.

SELF-BINDER KNOTTER.

Application filed April 2, 1925. Serial No. 20,262.

*To all whom it may concern:*

Be it known that I, ELBERT A. HUFFMAN, a citizen of the United States, residing at Poncha Springs, in the county of Chaffee and State of Colorado, have invented certain new and useful Improvements in Self-Binder Knotters; and I do declare the following to be a full, clear, and exact description of the invention, such as will enable others skilled in the art to which it appertains to make and use the same.

My invention relates to improvements in the well known Appleby knotter which has for a number of years been used on practically every self-binder for grain and the like. In the mechanical formation of a knot in the twine-binding of bundles of grain, the twine is looped around the two pivoted fingers of the knotter, and said fingers then grip the free ends of the twine and are intended to draw them through the loop to form the knot. The fingers commonly used however have not been designed to effectively grip both ends of the twine if one happens to be a little thicker than the other. Moreover, there is insufficient clearance provided between the fingers and the twine loop, with the result that very often the twine ends cannot be drawn through said loop and consequently no knot is tied. The old knotter also fails to tie the knot, when it cannot effectively grip both ends of the twine. These defects in the old construction, require expenditure of a great deal of time and labor, in following any self-binder and tying the bundles by hand, which are missed by the mechanical binding means. It is the object of my invention however to provide a new and improved knotter, in which the difficulties heretofore encountered, are effectively overcome.

With the foregoing in view, the invention resides in the novel subject matter hereinafter described and claimed, the description being supplemented by the accompanying drawings.

Figure 1 is a perspective view of the improved knotter, showing its fingers in readiness to pull the twine ends through the loop of twine formed around said fingers.

Figure 2 is an enlarged sectional view partly in elevation.

In the drawings above briefly described, the numeral 1 designates the usual shank of the knotter, said shank having a head 2 at one end, which head is provided with a stationary finger 3 and with an opening 4 at the inner end of said finger. Co-operable with the finger 3, is a movable finger 5 having a shank 6 which passes through the opening 4 and is provided with the usual roller 7 for co-action with the common and well-known finger manipulating means.

In the operation of the present device, like the old structure used for years, the twine T, after passage around the bundle of grain, is looped around the fingers 3 and 5 as indicated at L. Then, the ends E of the twine are gripped between the two fingers and the knotter is manipulated to cause said fingers to draw said twine ends through the loop L, thus tying the knot. The difficulties heretofore experienced in the formation of this knot have been hereinbefore set forth and need not again be enumerated at this point, but the manner in which these difficulties are overcome, will be clear from the following description of the improved structure.

The inner side of each of the fingers 3 and 5 is provided with a central longitudinal twine-gripping rib 8 which is serrated in any desired manner, but preferably by the provision of angular transverse teeth 9. Each of the fingers 3 and 5 is also provided with longitudinal edge portions 10 which project laterally from the rib 8. The inner sides of these edge portions of one finger are spaced from the corresponding portions of the other finger when the knotter is closed as shown in Fig. 1, thus providing the opposite sides of the knotter with grooves 11 extending longitudinally between the edge portions 10 of the fingers 3 and 5. These grooves effectively receive the ends of the twine when said ends are being drawn through the loop L, so that they cannot bind against said loop and fail to pass through it. Moreover, the teeth 9 then effectively grip the ends of the twine, whether thick or thin, and insure that said ends shall not slip from engagement with the fingers 3 and 5, instead of being effectively pulled through the loop L.

It will be clear from the foregoing that my improvements in the well-known Appleby knotter, absolutely overcome difficulties which have been experienced with all kinds of self-binders, heretofore. These improvements are simple and the improved device may be easily and inexpensively manufactured, yet the advance in the art which they accomplish, is of extreme importance.

As excellent results have been obtained from the details disclosed, such details are preferably followed. However, within the scope of the invention as claimed, modifications may of course be made.

I claim:

1. In a knotter for self-binders of the type in which twine is looped around fingers of the knotter, and the twine ends then gripped by the fingers and drawn through the loop; a pair of fingers pivoted together and having longitudinal serrated-twine-gripping ribs on their inner sides, each of said fingers having edge portions projecting laterally from its rib, the inner sides of said laterally projecting edge portions of one finger being spaced from the corresponding portions of the other finger when said fingers are closed upon the twine ends, whereby to provide grooves in opposite sides of the knotter to receive said twine ends when the latter are pulled by the fingers through the twine loop around said fingers.

2. In a knotter for self-binders of the type in which twine is looped around fingers of the knotter, and the twine ends then gripped by the fingers and drawn through the loop; a pair of fingers pivoted together and having longitudinal twine-gripping ribs on their inner sides, each of said fingers having edge portions projecting laterally from its rib, the inner sides of said laterally projecting edge portions of one finger being spaced from the corresponding portions of the other finger when said fingers are closed upon the twine ends, whereby to provide grooves in opposite sides of the knotter to receive said twine ends when the latter are pulled by the fingers through the twine loop around said fingers.

In testimony whereof I have hereunto affixed my signature.

ELBERT ANSON HUFFMAN.